US010587418B2

(12) United States Patent
Jiang

(10) Patent No.: US 10,587,418 B2
(45) Date of Patent: Mar. 10, 2020

(54) AUTHENTICATING A USER AND REGISTERING A WEARABLE DEVICE

(71) Applicant: Alibaba Group Holding Limited, George Town (KY)

(72) Inventor: Long Jiang, Hangzhou (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 113 days.

(21) Appl. No.: 15/719,274

(22) Filed: Sep. 28, 2017

(65) Prior Publication Data
US 2018/0019878 A1 Jan. 18, 2018

Related U.S. Application Data

(63) Continuation of application No. PCT/CN2016/076415, filed on Mar. 15, 2016.

(30) Foreign Application Priority Data

Apr. 2, 2015 (CN) .......................... 2015 1 0155552

(51) Int. Cl.
H04L 9/32 (2006.01)
H04L 9/08 (2006.01)
(Continued)

(52) U.S. Cl.
CPC .......... *H04L 9/3247* (2013.01); *H04B 1/385* (2013.01); *H04L 5/0055* (2013.01);
(Continued)

(58) Field of Classification Search
CPC ... H04L 9/3247; H04L 5/0055; H04L 9/0894; H04L 9/14; H04L 9/30; H04L 9/32;
(Continued)

(56) References Cited

U.S. PATENT DOCUMENTS 9,197,635 B2 * 11/2015 Rodriguez ............. H04L 9/321
2003/0076961 A1 * 4/2003 Kim ........................ H04L 9/006
380/282
(Continued)

FOREIGN PATENT DOCUMENTS

CN 101192926 6/2008
CN 102421097 4/2012
(Continued)

OTHER PUBLICATIONS

International Search Report by the International Searching Authority issued in International Application No. PCT/CN2016/076415 dated Jun. 13, 2016; 8 pages.
(Continued)

*Primary Examiner* — Yonas A Bayou
(74) *Attorney, Agent, or Firm* — Fish & Richardson P.C.

(57) ABSTRACT

An authentication request including at least one of a user identifier and a wearable device identifier of a user is received at a server from a terminal. The server stores a relationship between the user identifier, the wearable device identifier, and a server authentication key. Downlink authentication information is acquired by the server. A detection instruction including the downlink authentication information and the wearable device identifier is issued to the terminal. A detection acknowledgment returned by the terminal is received by the server. The detection acknowledgment includes uplink authentication information generated by a wearable device designated in the detection instruction, according to a device authentication key and the downlink authentication information. The device authentication key is the same as, or corresponds to, the server authentication key. The user is authenticated by the server, including matching the downlink authentication information with the uplink
(Continued)

authentication information by using the server authentication key.

20 Claims, 7 Drawing Sheets

(51) Int. Cl.
| | |
|---|---|
| *H04L 5/00* | (2006.01) |
| *H04L 9/14* | (2006.01) |
| *H04L 9/30* | (2006.01) |
| *H04L 29/06* | (2006.01) |
| *H04W 12/06* | (2009.01) |
| *H04B 1/3827* | (2015.01) |

(52) U.S. Cl.
CPC .............. *H04L 9/0894* (2013.01); *H04L 9/14* (2013.01); *H04L 9/30* (2013.01); *H04L 9/32* (2013.01); *H04L 9/3226* (2013.01); *H04L 63/08* (2013.01); *H04L 63/0823* (2013.01); *H04W 12/06* (2013.01); *H04L 29/06* (2013.01); *H04L 67/42* (2013.01); *H04L 2463/102* (2013.01)

(58) Field of Classification Search
CPC ... H04L 9/3226; H04L 63/08; H04L 63/0823; H04B 1/385; H04W 12/06
See application file for complete search history.

(56) References Cited

U.S. PATENT DOCUMENTS

| | | | | |
|---|---|---|---|---|
| 2003/0126436 A1* | 7/2003 | Greenberg | ............ | H04L 9/3271 713/168 |
| 2005/0113070 A1* | 5/2005 | Okabe | .................. | H04W 12/06 455/411 |
| 2005/0250473 A1* | 11/2005 | Brown | ................. | H04L 9/3271 455/411 |
| 2006/0036857 A1* | 2/2006 | Hwang | .................. | G06F 21/31 713/168 |
| 2007/0067629 A1* | 3/2007 | Mackenzie | ........... | H04L 9/0844 713/168 |
| 2007/0186099 A1* | 8/2007 | Beck | ....................... | G06F 21/34 713/159 |
| 2008/0046740 A1* | 2/2008 | Narayanan | ............ | H04L 63/083 713/176 |
| 2008/0301435 A1* | 12/2008 | Simon | ................... | H04L 9/3271 713/155 |
| 2010/0070766 A1* | 3/2010 | Lu | ......................... | H04L 9/3271 713/168 |
| 2010/0257362 A1* | 10/2010 | Ramzan | ................ | H04L 9/0844 713/168 |
| 2011/0154460 A1 | 6/2011 | Khare et al. | | |
| 2013/0268687 A1 | 10/2013 | Schrecker | | |

FOREIGN PATENT DOCUMENTS

| | | | |
|---|---|---|---|
| CN | 103178969 | | 6/2013 |
| CN | 103716794 | | 4/2014 |
| CN | 103716794 A | * | 4/2014 |
| CN | 104065653 | | 9/2014 |
| CN | 104219058 | | 12/2014 |
| CN | 104219626 | | 12/2014 |
| CN | 104243484 | | 12/2014 |
| JP | 2002374244 | | 12/2002 |
| JP | 2004518229 | | 6/2004 |

OTHER PUBLICATIONS

Search Report and Written Opinion issued by the Intellectual Property Office of Singapore in Singapore Application No. 11201708032T dated Jun. 21, 2018; 9 pages.
European Extended Search Report in European Application No. 16771252.0, dated Oct. 29, 2018, 8 pages.
Paniagua Diez et al., "Toward Self Authenticable Wearable Devices," IEEE Wireless Communications, Feb. 2015, 22(1):36-43.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

\* cited by examiner

AUTHENTICATING A USER AND REGISTERING A WEARABLE DEVICE

This application is a continuation of PCT Application No. PCT/CN2016/076415, filed on Mar. 15, 2016, which claims priority to Chinese Patent Application No. 201510155552.4, filed on Apr. 2, 2015, the entire contents of each are hereby incorporated by reference.

BACKGROUND

With the rapid development of Internet technologies, users can perform all kinds of activities, such as handling official businesses, entertainment, shopping, and money management. Services that support the activities can be provided through networks and can involve multiple service providers. The user can register for services provided by the service providers. After registration, the user may need to provide an account and password each time a service is to be accessed, so that the server can authenticate the user and provide the corresponding service.

For security reasons, the user may try to avoid using a same account and a same password for the multiple service providers. When the user wants to register with additional service providers for additional services, the user may be burdened with memorizing new account and passwords for each new service provider.

SUMMARY

The present disclosure describes techniques for authentication and registration of a user.

In an implementation, an authentication request including at least one of a user identifier and a wearable device identifier of a user is received at a server from a terminal. The server stores a relationship between the user identifier, the wearable device identifier, and a server authentication key. Downlink authentication information is acquired by the server. A detection instruction including the downlink authentication information and the wearable device identifier is issued to the terminal. A detection acknowledgment returned by the terminal is received by the server. The detection acknowledgment includes uplink authentication information generated by a wearable device designated in the detection instruction, according to a device authentication key and the downlink authentication information. The device authentication key is the same as, or corresponds to, the server authentication key. The user is authenticated by the server, including matching the downlink authentication information with the uplink authentication information by using the server authentication key.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. For registration and authentication by a user with a new network service, the user does not need to input any account or password information, which can reduce the burden on the user and improve the efficiency of the user when acquiring new network services. Other advantages will be apparent to those of ordinary skill in the art.

The details of one or more implementations of the subject matter of this specification are set forth in the Detailed Description, the claims, and the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for authentication and registration of a user, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from scope of the disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Implementations in the present disclosure can include the use of a server authentication key and a device authentication key that are set on a server and a wearable device. Using these keys, the server can authenticate (through interaction with a terminal) a wearable device of a user. The authentication can occur without requiring the user to memorize or enter any account or password.

Wearable devices can include, for example, portable devices that can be worn by a user or integrated into a user's clothing or accessory. Example wearable devices include wristbands, smart watches, smart shoes, smart clothes, smart glasses, smart helmets, smart rings, and other devices that can provide some computing functionality. Wearable devices can be connected to a terminal, such as a smart phone, a tablet computer, or a personal computer, through a hardware interface or a wireless local area network. When connected, wearable devices can implement a variety of functions by exchanging data with the terminal.

Each wearable device can generally be specific to one user, since the user may tend to wear their wearable device whenever and wherever possible. Implementations of the present application include techniques for authenticating a user. Authentication can occur by using storage and computing functions of the wearable device, without requiring the user to memorize and frequently input an account and a password.

Figure 1:
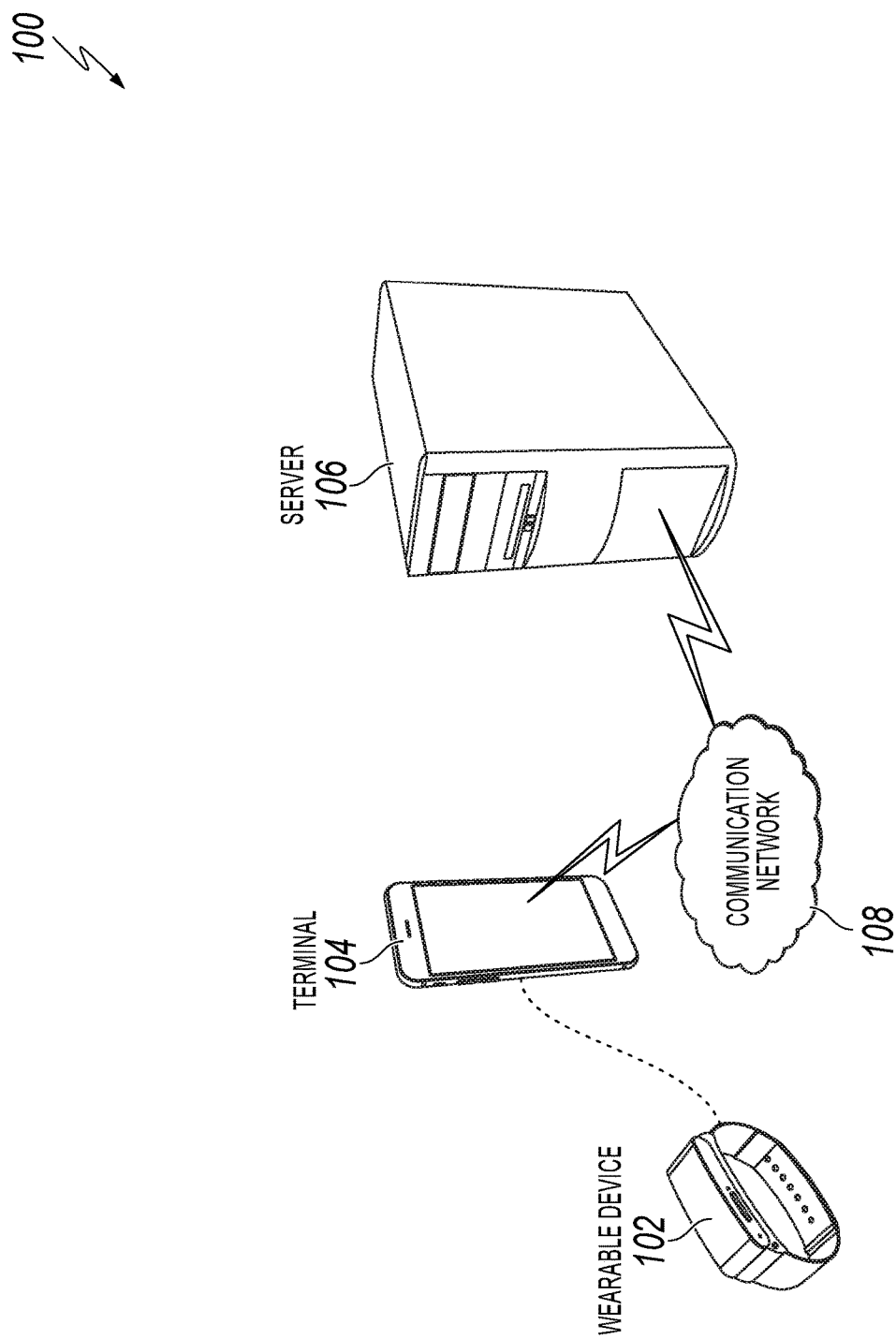
FIG. 1 is a block diagram illustrating an example of a network environment, according to an implementation of the present disclosure.

FIG. 1 is a block diagram illustrating an example of a network environment 100, according to an implementation of the present disclosure. The network environment 100 includes a wearable device 102 that is connected to a terminal 104. The connection can be made, for example, through a hardware interface or a wireless local area network. The hardware interface can be, for example, an audio interface, a Universal Serial Bus (USB) interface, or some other interface. The wireless local area network can be BLUETOOTH, wireless-fidelity (Wi-Fi), ZIGBEE, or some other network. The terminal 104 can be, for example, a smart phone, a tablet computer, or a personal computer.

The terminal 104 can communicate with a server 106 through a communication network 108 such as the Internet, a mobile communication network, or combination of networks. In one example scenario, a user using the wearable device 102 connected to the terminal 104 can send an access request to the server 106, such as to authenticate the user. In implementations of the present disclosure, no limitations are made as to the type of the terminal 104, hardware interfaces and a wireless local area network protocols through which the wearable device 102 is connected to the terminal 104, protocols and network structures of the communication network 108, and specific implementations of the server 106.

Figure 2:
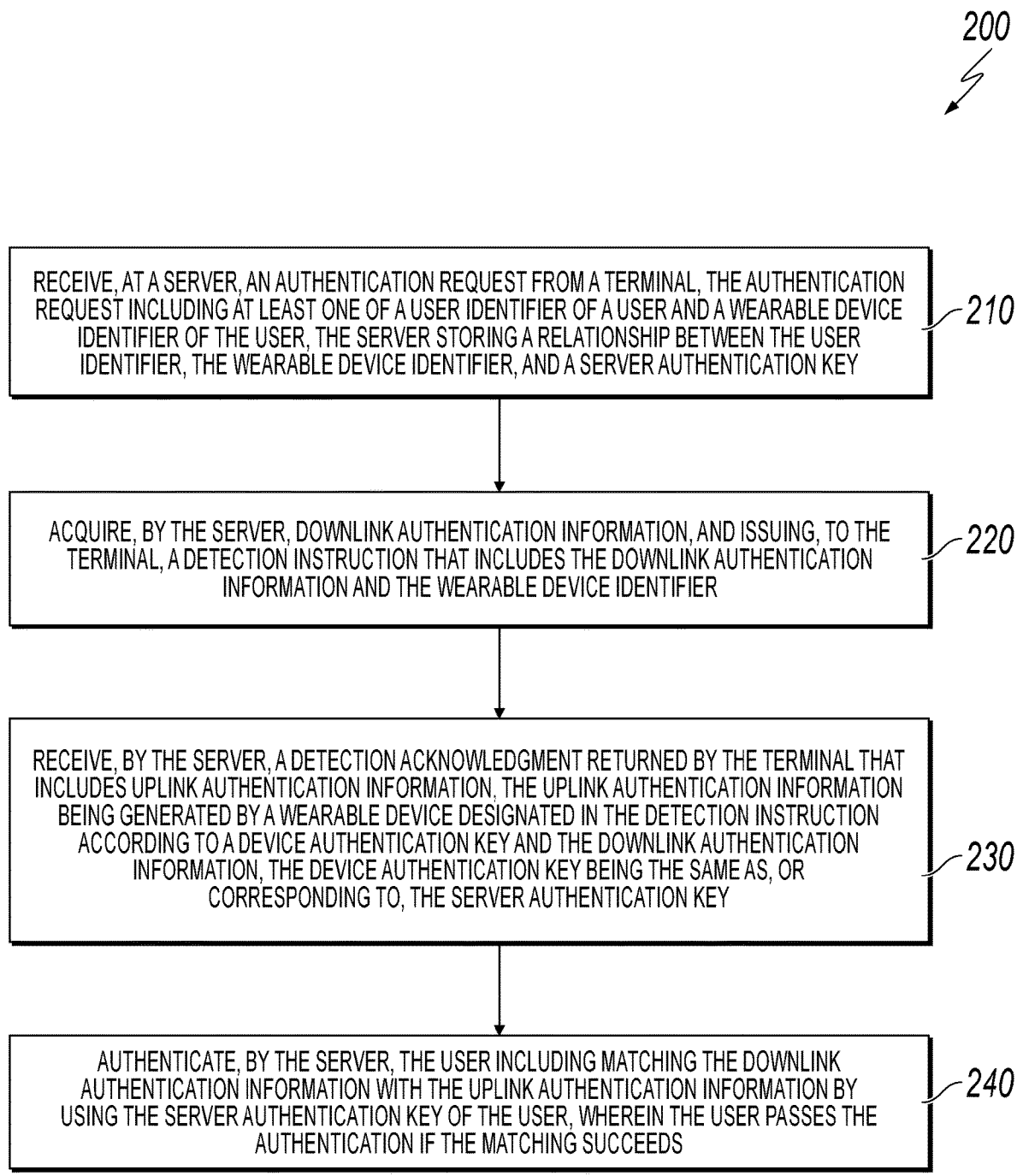
FIG. 2 is a flowchart illustrating an example of a method for server-side authentication of a user, according to an implementation of the present disclosure.

FIG. 2 is a flowchart illustrating an example of a method 200 for server-side authentication of a user, according to an implementation of the present disclosure. For example, method 200 can be used for authenticating a user of the wearable device 102. Authentication can be completed using a combination of the terminal 104 and the server 106. For clarity of presentation, the description that follows generally describes method 200 in the context of the other figures in this description. However, it will be understood that method 200 can be performed, for example, by any suitable system, environment, software, and hardware, or a combination of systems, environments, software, and hardware, as appropriate. In some implementations, various steps of method 200 can be run in parallel, in combination, in loops, or in any order.

At 210, an authentication request is received from a terminal. For example, the authentication request can be sent by a user through a terminal. The authentication request can include at least one of a user identifier of a user and a wearable device identifier of the user. The server 106 can store a relationship between the user identifier, the wearable device identifier, and a server authentication key.

The authentication request can be received, for example, when the user requests a service from the server 106 that requires identity authentication of the user, such as during a login, prior to access to a personal account, during a payment, or for some other reason. The server 106 can then require, from the terminal, related information for authenticating the user. In response, the terminal can send an authentication request to the server. The authentication request can include one or both of the user identifier of the user and the wearable device identifier of the user. After the server receives the authentication request of the terminal, identification of the user requesting authentication can be made using one or both of the user identifier and the wearable device identifier.

In some implementations, the server 106 can store a corresponding relationship between a user identifier, a wearable device identifier, and a server authentication key. The user identifier is a unique identifier by which the server can distinguish the user from other users. The user identifier can include, for example, a user name, a registered email address, or some other user identifying information. If the user is bound to a mobile terminal, the user identifier can also be a number, such as an International Mobile Equipment identity (IMIE) number. The wearable device identifier can be used to uniquely represent the wearable device. The wearable device identifier can vary depending on each different device type and each different wireless local area network protocol that is used. The wearable device identifier can generally be a hardware address of the wearable device, such as a Media Access Control (MAC) address. The server authentication key can be stored on the server 106. The server authentication key can be the same as (or can correspond to) a device authentication key, which can be stored on the wearable device according to an encryption algorithm using the server authentication key. The wearable device identifier and the server authentication key stored on the server can have a one-to-one correspondence with each other. If a particular user has more than one wearable device that can require authentication, a same user identifier can correspond to two or more wearable device identifiers and server authentication keys. A relationship between the user identifier, the wearable device identifier, and the server authentication key can be stored in the server 106 locally. In some implementations, the relationship can also be stored in other storage devices accessible to the server 106, such as in a disk array for storing local area networks or in a cloud storage network.

In some implementations, the authentication request is a payment request sent by a user through a payment client terminal. In some implementations, the payment request is triggered by information which is selected by the user on the payment client terminal and can indicate making a payment by a wearable device. A payment operation is performed after the authentication is successful.

In some implementations, the authorization request is a payment request sent to a server in response to a payment operation of a user on a payment client terminal. The payment request includes a user identifier and/or a wearable device identifier of the user. In some implementations, the payment operation of the user on the payment client terminal is specifically an operation which is selected by the user and indicates making a payment by a wearable device. A payment operation is performed after the authentication is successful.

In some implementations, a payment authentication information sent by a payment client terminal is received at a server. The payment authentication information includes downlink authentication information issued by the server based on a payment request of a user sent by the payment client terminal. Uplink authentication information is generated that is based on a stored device authentication key and the downlink authentication information. The uplink authentication information is sent to the payment client terminal. The payment client terminal sends the uplink authentication information to the server. The server can authenticate the user based on the uplink authentication information and perform a payment operation after the authentication is successful. From 210, method 200 proceeds to 220.

At 220, downlink authentication information is acquired by the server. For example, the server 106 can issue a detection instruction to the terminal that includes the downlink authentication information and the wearable device identifier. The downlink authentication information can be a part of (and included in) the authentication data. In some implementations, the downlink authentication information can also be a ciphertext after the authentication data is encrypted using the server authentication key stored on the server 106. The server 106 can obtain the authentication data in any manner. For example, the server can randomly generate the authentication data, or the server 106 can capture a certain number of bytes from a file or an image. The server 106 can generate the authentication data locally on its own. In some implementations, the server 106 can also acquire the authentication data from another server. From 220, method 200 proceeds to 230.

After receiving the authentication request of the terminal, the server 106 can extract one or both of the user identifier and the wearable device identifier in the authentication request. The server 106 can determine whether one or both of the user identifier and the wearable device identifier are included. The determination can be made using the stored relationship between the user identifier, the wearable device identifier, and the server authentication key. The server can reject the authentication request if neither one of the user identifier nor the wearable device identifier is included, or if the user identifier and the wearable device identifier in the authentication request do not belong to a same user. Otherwise, the server can acquire authentication data. For downlink authentication information that is in plain text format, the server can encapsulate the authentication data and the wearable device identifier of the user in a detection instruction, and the server can issue the detection instruction to the terminal. For downlink authentication information that is in ciphertext format, the server can encrypt the authentication data by using a server authentication key corresponding to the user identifier or the wearable device identifier in the authentication request. The server can also generate downlink authentication information, encapsulate the downlink authentication information and the wearable device identifier of the user in a detection instruction, and issue the detection instruction to the terminal.

At 230, a detection acknowledgment is received by the server. For example, the detection acknowledgment can be returned by the terminal and can include uplink authentication information that is generated by a wearable device designated in the detection instruction according to a device authentication key and the downlink authentication information. The device authentication key can be the same as (or can correspond to) the server authentication key.

The server 106 can receive the detection acknowledgment returned by the terminal, extract the uplink authentication information therefrom, and determine whether the uplink authentication information is matched with the downlink authentication information. The matching can be done using the server authentication key of the user to determine an authentication result of the user. When the uplink authentication information is in plain text format, the uplink authentication information can be compared with authentication data for generating a ciphertext, or the uplink authentication information that has been encrypted by using the server authentication key can be compared with the downlink authentication information. If a match is found, then the user can pass the authentication; otherwise, the authentication can fail. When the uplink authentication information is in ciphertext format, the uplink authentication information can be decrypted using the server authentication key, and then compared with the downlink authentication information. If there is a match, then the user passes the authentication; otherwise, the authentication can fail. From 230, method 200 proceeds to 240.

At 240, the user is authenticated by the server. Authentication can include, for example, matching the downlink authentication information with the uplink authentication information by using the server authentication key of the user. If the matching succeeds, then the user passes the authentication. The server can return an authentication result to the terminal that indicates whether the user passes the authentication. After 240, method 200 stops.

Figure 3:
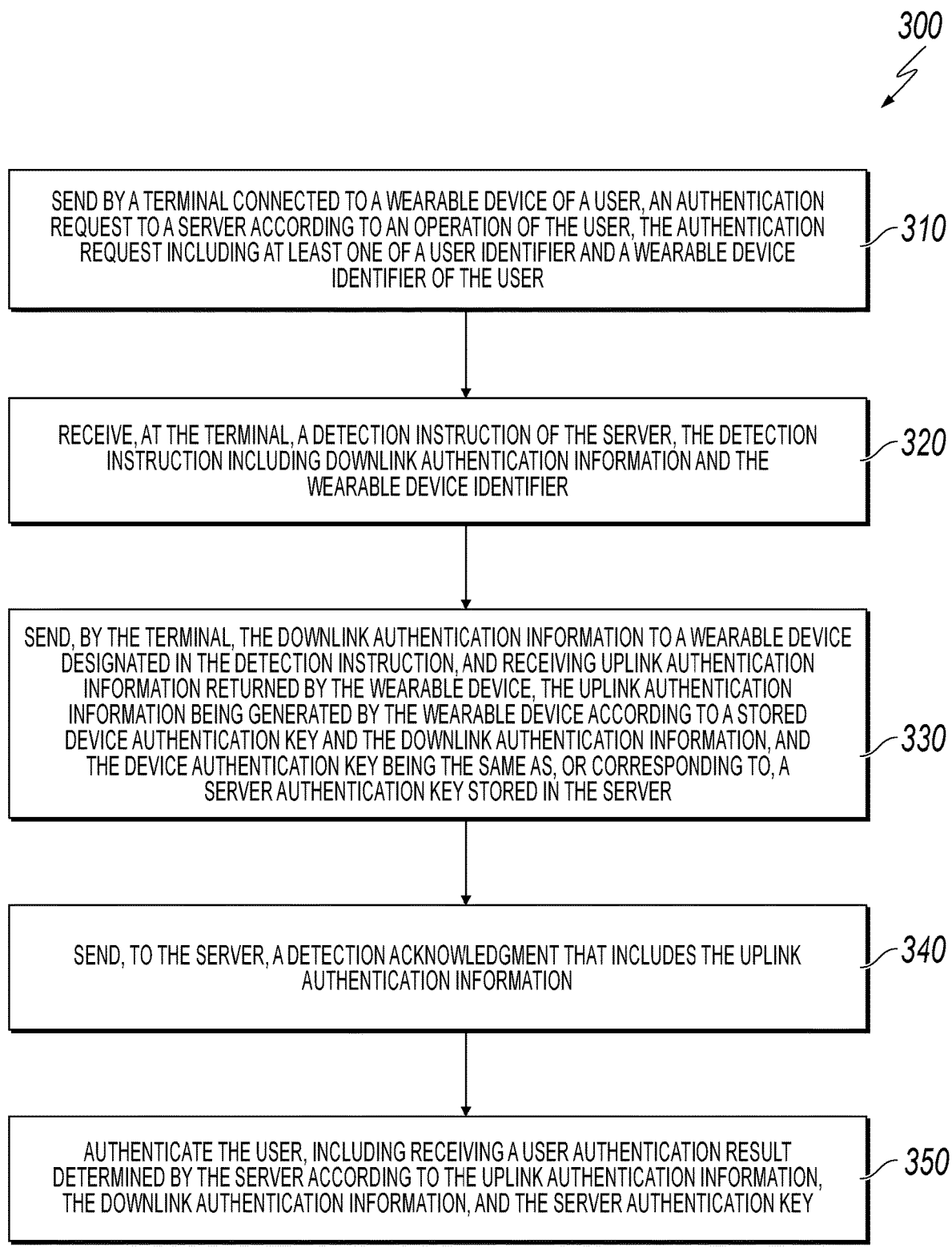
FIG. 3 is a flowchart illustrating an example of a method for terminal-side authentication of a user, according to an implementation of the present disclosure.

FIG. 3 is a flowchart illustrating an example of a method 300 for terminal-side authentication of a user, according to an implementation of the present disclosure. Method 300 is the terminal-side counterpart of the server-side method 200 of FIG. 2. Method 300 can be used, for example, to authenticate a user of the wearable device 102. Authentication can be completed using a combination of the terminal 104 and the server 106. For clarity of presentation, the description that follows generally describes method 300 in the context of the other figures in this description. However, it will be understood that method 300 can be performed, for example, by any suitable system, environment, software, and hardware, or a combination of systems, environments, software, and hardware, as appropriate. In some implementations, various steps of method 300 can be run in parallel, in combination, in loops, or in any order.

At 310, an authentication request is sent by a terminal connected to a wearable device of a user. For example, the authentication request can be sent to the server 106 subsequent to an operation of the user. The authentication request can include at least one of a user identifier and a wearable device identifier of the user. From 310, method 300 proceeds to 320.

At 320, a detection instruction of the server is received at the terminal. The detection instruction can include downlink authentication information and the wearable device identifier. From 320, method 300 proceeds to 330.

At 330, the downlink authentication information is sent by the terminal to a wearable device designated in the detection instruction. For example, the terminal 104 can receive uplink authentication information returned by the wearable device. The uplink authentication information can be generated by the wearable device according to a stored device authentication key and the downlink authentication information. The device authentication key can be the same as (or can correspond to) a server authentication key stored in the server. In some implementations, if the wearable device designated in the detection instruction has not yet been connected to the terminal, the terminal can be required to first complete a connection with the wearable device according to a wireless local area network protocol supported by the wearable device.

After receiving the downlink authentication information, if the downlink authentication information is in plain text format, then the wearable device can encrypt the downlink authentication information by using the device authentication key to generate uplink authentication information as a ciphertext. If the downlink authentication information is in a ciphertext format, then the wearable device can decrypt the downlink authentication information by using the device authentication key to generate uplink authentication information in a plain text format. As a result, the downlink authentication information in a plain text format can correspond to the uplink authentication information in a ciphertext format. Similarly, the downlink authentication information in a ciphertext format can correspond to the uplink authentication information in a plain text format. The wearable device can then return the uplink authentication information to the terminal.

After receiving the uplink authentication information returned by the wearable device, the terminal can encapsulate the uplink authentication information in a detection acknowledgment that can be sent to the server. The detection acknowledgment can include the wearable device identifier. From 330, method 300 proceeds to 340.

At 340, a detection acknowledgment is sent to the server that includes the uplink authentication information. For example, the detection acknowledgment can be sent to the server 106. From 340, method 300 proceeds to 350.

At 350, the user is authenticated. Authentication can include, for example, receiving a user authentication result determined by the server according to the uplink authentication information, the downlink authentication information, and the server authentication key.

In some implementations, a server authentication key and a device authentication key (which can be the same) can be set on a server and a wearable device. The server can authenticate, through interaction with the terminal, a designated wearable device by using the device authentication key stored on the wearable device and the server authentication key stored on the server. This results in authentication of the user corresponding to the wearable device. In this process, the user neither needs to memorize, use, or input any account or password information during authentication, which can reduce the burden on the user and improve the efficiency of the user when acquiring a network service.

In some implementations, a user public key of the user can be stored on the server. Also, a user private key of the user can be stored on the terminal. In some implementations, user identification can use a different user public key and a different user private key, which can serve as a pair of keys in asymmetric encryption. The user public key stored on the server can correspond to the user identifier, the wearable device identifier, and the server authentication key of the user. In these and other implementations, the terminal can sign (or annotate) data that is included in the detection acknowledgment by using the stored user private key. The detection acknowledgment can include the uplink authentication information and can also include the wearable device identifier, the user identifier, and other data. The terminal can send the signed detection acknowledgment to the server. The server can perform signature verification on the detection acknowledgment by using the user public key of the user. If the detection acknowledgment passes the verification, step 240 can be performed to match the uplink authentication information with the downlink authentication information. If the detection acknowledgment fails to pass the signature verification, then the terminal is notified that the authentication has failed. Some implementations can mandate that a terminal to which a wearable device is connected is required store a user private key of a user when the user uses the wearable device for authentication, which can achieve better security.

In some implementations, a terminal identifier can be added to the corresponding relationship between the user identifier, the wearable device identifier, and the server authentication key of the user stored on the server. Addition of the terminal identifier can allow the terminal to be used when performing user authentication through the wearable device connected to the terminal. In such a situation, the server can store a corresponding relationship between the user identifier, the wearable device identifier, and the server authentication key of the user and the terminal identifier. An authentication request sent by the terminal to the server can include a terminal identifier of the terminal. After receiving the authentication request, the server can identify, in the stored corresponding relationship, a terminal identifier corresponding to the user identifier or the wearable device identifier in the authentication request. The server can then compare the terminal identifier with the terminal identifier for sending the authentication request. If the identifiers are the same, then step 220 can be performed to continue the authentication process. If the identifiers are different, then the authentication request of the terminal can be rejected, thus failing the user authentication. Such an implementation is equivalent to binding a wearable device to a terminal capable of performing user authentication through the wearable device. As a terminal (especially a mobile terminal) generally is also specific to a user, binding a wearable device to the terminal can significantly improve the security of user authentication.

The authentication process can be applied to any scenario that requires authenticating a user identity. Such scenarios can include, for example, user identity authentication in the case of login, identity authentication when a user accesses a personal account, identity authentication when a user makes a payment through a third-party payment platform, and in other scenarios. In these and other scenarios, after the user passes the authentication, the server can provide a subsequent service, and the terminal can execute a subsequent operation. For example, in payment scenarios requiring identity authentication, the authentication request sent by the terminal to a payment server can be a payment request. After the user passes the authentication, the payment server can provide a payment service for the user passing the authentication. After receiving, from the server, an authentication result indicating that the user has passed the authentication, the terminal can interact with the payment server to complete a payment operation of the user.

In some implementations, the relationship between the user identifier, the wearable device identifier, and the server authentication key of the user can be preset on the server. Further, corresponding device authentication key can be preset on the wearable device. In some implementations, the relationship can first be generated on the server, and the device authentication key can be provided to and stored on the wearable device through a registration process before the authentication process. After 350, method 300 stops.

Figure 4:
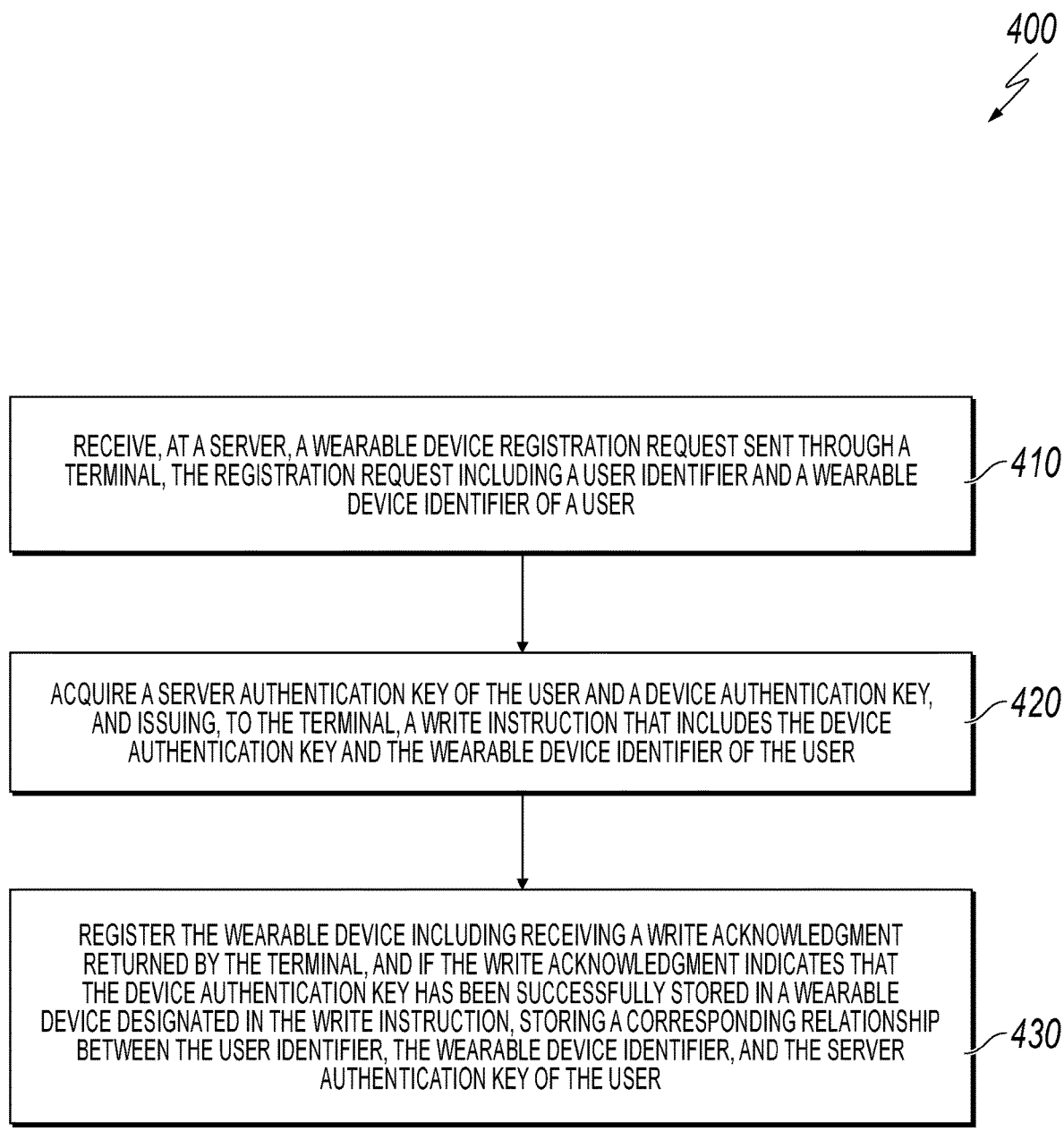
FIG. 4 is a flowchart illustrating an example of a method for server-side registration of a wearable device, according to an implementation of the present disclosure.

FIG. 4 is a flowchart illustrating an example of a method 400 for server-side registration of a wearable device, according to an implementation of the present disclosure. For example, method 400 can be used for registering a user of the wearable device 102. Registration can be completed using a combination of the terminal 104 and the server 106. For clarity of presentation, the description that follows generally describes method 400 in the context of the other figures in this description. However, it will be understood that method 400 can be performed, for example, by any suitable system, environment, software, and hardware, or a combination of systems, environments, software, and hardware, as appropriate. In some implementations, various steps of method 400 can be run in parallel, in combination, in loops, or in any order.

At 410, a wearable device registration request that is sent through a terminal is received at a server. The registration request can include a user identifier and a wearable device identifier of a user. The registration request can be sent, for example, when the user registers a wearable device with the server on the terminal, and the terminal sends a wearable device registration request to the server according to an operation of the user. From 410, method 400 proceeds to 420.

At 420, a server authentication key of the user and a device authentication key are acquired, and a write instruction is issued to the terminal that includes the device authentication key and the wearable device identifier of the user.

After receiving the wearable device registration request of the terminal, the server can acquire a server authentication key and a device authentication key that are used for the encryption algorithm and that correspond to the wearable device identifier. Acquisition can be according to an encryption algorithm adopted for the uplink authentication information or downlink authentication information in the authentication process. The server authentication key and the device authentication key can be one key, such as a key used in a symmetric encryption algorithm. The server authentication key and the device authentication key can also be a pair of keys, such as a public key and a private key used in an asymmetric encryption algorithm. The server can generate the server authentication key and the device authentication key by itself, or the server can obtain the server authentication key and the device authentication key from another server. The server can encapsulate the acquired device authentication key and the corresponding wearable device identifier in a write instruction that the server can send to the terminal. From 420, method 400 proceeds to 430.

At 430, the wearable device is registered. Registration can include receiving a write acknowledgment returned by the terminal. If the write acknowledgment indicates that the device authentication key has been successfully stored in a wearable device designated in the write instruction, then the server can store a corresponding relationship between the user identifier, the wearable device identifier, and the server authentication key of the user. After 430, method 400 stops.

Figure 5:
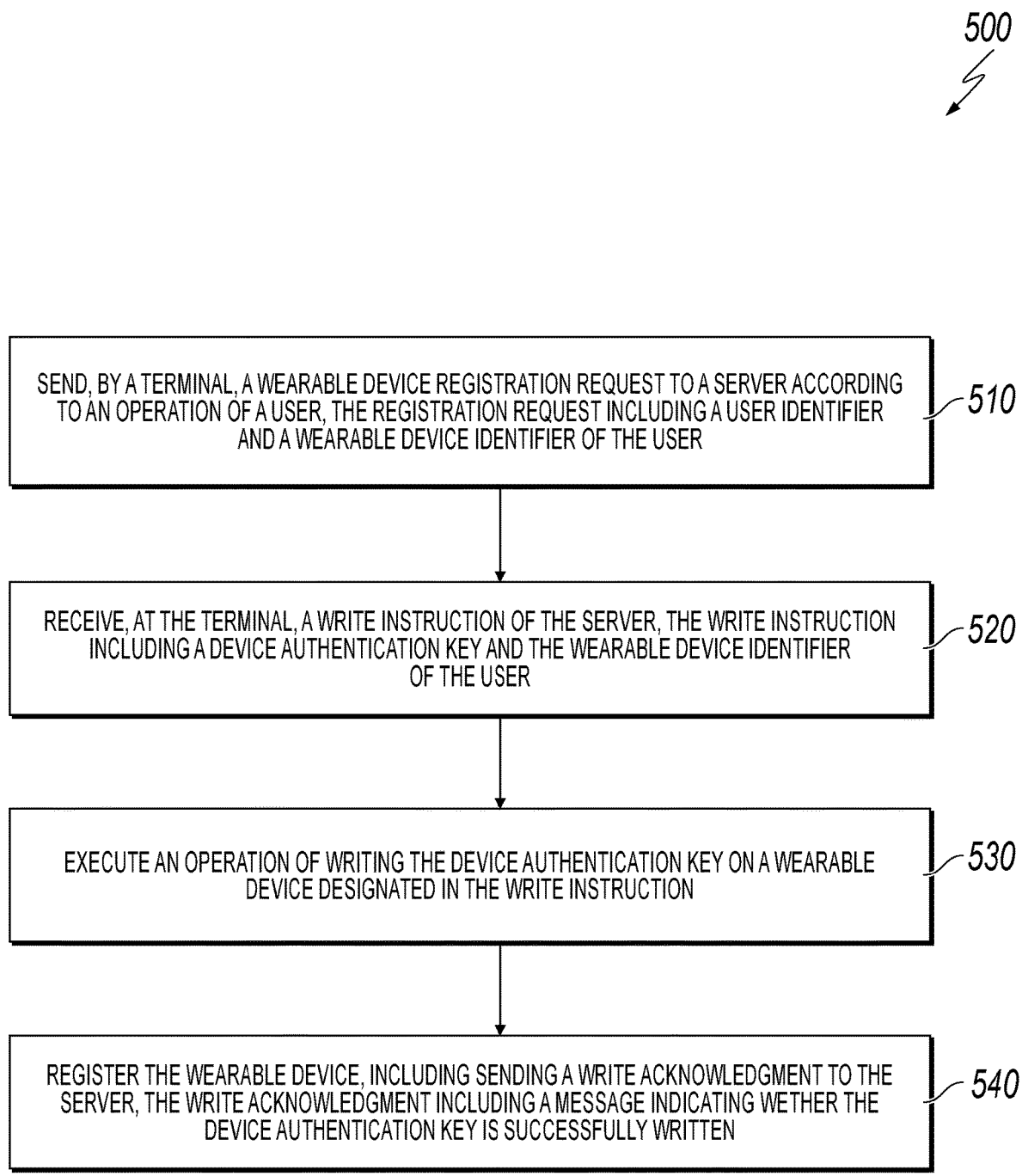
FIG. 5 is a flowchart illustrating an example of a method for terminal-side registration of a wearable device, according to an implementation of the present disclosure.

FIG. 5 is a flowchart illustrating an example of a method 500 for terminal-side registration of a wearable device, according to an implementation of the present disclosure. Method 500 is the terminal-side counterpart of the server-side method 400 of FIG. 4. Method 500 can be used for registering a user of the wearable device 102. Registration can be completed using a combination of the terminal 104 and the server 106. For clarity of presentation, the description that follows generally describes method 500 in the context of the other figures in this description. However, it will be understood that method 500 can be performed, for example, by any suitable system, environment, software, and hardware, or a combination of systems, environments, software, and hardware, as appropriate. In some implementations, various steps of method 500 can be run in parallel, in combination, in loops, or in any order.

At 510, a wearable device registration request is sent by a terminal to a server. The registration request can include a user identifier and a wearable device identifier of the user. From 510, method 500 proceeds to 520.

At 520, a write instruction of the server is received at the terminal. The write instruction can include a device authentication key and the wearable device identifier of the user. From 520, method 500 proceeds to 530.

At 530, the device authentication key is written to the wearable device designated in the write instruction. For example, after the terminal receives the write instruction from the server, the terminal can send the device authentication key in the write instruction to a wearable device. The write instruction can include a request that the wearable device store the device authentication key. In some implementations, such as during the use of permission settings on the wearable device, the wearable device can complete storage of the device authentication key only after the user confirms the write operation. In some implementations, confirmation can occur when the user taps on the wristband when prompted for confirmation. From 530, method 500 proceeds to 540.

At 540, registering the wearable device, including sending a write acknowledgment to the server, the write acknowledgment including a message indicating whether the device authentication key is successfully written. For example, after completing the write operation with the wearable device, the terminal can encapsulate a message in a write acknowledgment that indicates whether the device authentication key was successfully written. After 540, method 500 stops.

In some implementations, the server can require the terminal to provide a password of the user to improve security of registration of the wearable device. For example, the server can receive the write acknowledgment of the terminal, and if the message carried in the write acknowledgment is that the device authentication key has been successfully stored in the wearable device, the server can issue a password confirmation request to the terminal. The confirmation request can require the terminal to provide a password of the user corresponding to the wearable device. The terminal can receive the password confirmation request of the server, and the terminal can return a password confirmation acknowledgment that includes the user password input by the user. After receiving the password confirmation acknowledgment that includes the user password, if the server determines that the user password is correct, then the server can store the corresponding relationship between the user identifier, the wearable device identifier, and the server authentication key of the user. Registration of the wearable device can then be indicated as being successful. If the user password is incorrect, then the registration request of the terminal can be rejected, and registration can fail. The server can send a registration result to the terminal that indicates success or failure.

In some implementations, a user public key and a user private key of the user can be generated automatically in the registration process. Specifically, after a successful operation of writing the device authentication key in the wearable device by the terminal, the terminal can generate a user public key and a user private key of the user according to an algorithm. The terminal can then store the generated user private key locally, encapsulate the user public key in a write acknowledgment, and send the write acknowledgment to the server. After the terminal successfully writes the device authentication key in the wearable device or it is verified that the user password is correct, the server can store a corresponding relationship between the user identifier, the wearable device identifier, the server authentication key, and the user public key of the user.

In some implementations, a server public key and a server private key can be preset on the server, and a terminal private key and a terminal public key can be preset on the terminal. For example, the server public key and the terminal private key can be a pair of keys, and the server private key and the terminal public key can be a pair of keys. In these and other implementations, the server can sign the detection instruction by using the stored server private key, and the server can send the signed detection instruction to the terminal. The terminal can perform signature verification on the received detection instruction by using the stored terminal public key. The terminal can reject the detection instruction if the verification fails, in which case registration fails. In some implementations, the server can sign the write instruction by using the stored server private key, and the server can send the signed write instruction to the terminal. The terminal can perform signature verification on the received write instruction by using the stored terminal public key. The terminal can reject the write instruction if the verification fails, in which case registration fails. The terminal can sign the write acknowledgment by using the stored terminal private key, and the terminal can send the signed write acknowledgment to the server. The server can perform signature verification on the received write acknowledgment by using the stored server public key, and the server can reject the registration request of the terminal, in which case verification fails.

In some implementations, the server and the terminal can conduct communication through an encrypted channel, such as to further improve security of wearable device registration and user authentication. For example, the detection instruction and the detection acknowledgment in the authentication method embodiment and the write instruction and the write acknowledgment in the registration method embodiment all can be transmitted in an encrypted channel.

In some implementations, a payment client terminal running on the terminal can authenticate a user identity in a payment process by using a wearable device connected to the terminal. A specific process of this embodiment is as follows:

On the wearable device, a payment binding request of the payment client terminal is received. The payment binding request can include a device authentication key of the wearable device. In response to the payment binding request issued by the user through the payment client terminal, the wearable device can store the device authentication key included in the payment binding request in a local memory.

When making a payment operation on the payment client terminal, the user can select the wearable device to make a payment, which can trigger a response of the payment client terminal and send a payment request to the server. The payment request can include a user identifier and/or a wearable device identifier of the user.

After receiving the payment request sent by the user through the payment client terminal, the server can acquire downlink authentication information. The server can also issue, to the payment client terminal, an authentication instruction that includes the downlink authentication information and the wearable device identifier.

The payment client terminal can receive the authentication instruction issued by the server. The payment client terminal can include the downlink authentication information in payment authentication information and send the payment authentication information to a wearable device designated in the authentication instruction.

The wearable device can receive the payment authentication information sent by the payment client terminal. The wearable device can extract, from the payment authentication information, the downlink authentication information issued by the server based on the payment request of the user sent by the payment client terminal. The wearable device can generate uplink authentication information according to the stored device authentication key and the downlink authentication information. The wearable device can send the uplink authentication information to the payment client terminal. The payment client terminal can receive the uplink authentication information returned by the wearable device and can include the uplink authentication information in authentication response information and sends the authentication response information to the server.

The server can receive the authentication response information that includes the uplink authentication information returned by the payment client terminal. The server can match the downlink authentication information with the uplink authentication information by using the server authentication key of the user. The user can pass the authentication if the matching succeeds, and the user can perform a payment operation after the authentication is successful. The server authentication key of the user can be the same as the device authentication key of the wearable device designated in the authentication instruction.

In some implementations, a server authentication key and a device authentication key (which can be identical) can be set on a server and a wearable device. The wearable device can be authenticated by using the device authentication key and the server authentication key. In this way, payment authentication can be completed for a user corresponding to the wearable device, and the user can make a payment on a payment client terminal by using the wearable device. In this process, the user neither needs to memorize, use, or input any account or password information during authentication, which can reduce the burden on the user and improve the efficiency of the user when acquiring a network service.

In some implementations, after registering a wristband with a payment server through a client terminal, such as through an application running on a mobile phone terminal, the user can complete a network payment through the wristband without inputting any account and any password. A server public key and a terminal private key in a pair (as well as a server private key and a terminal public key in a pair) can be preset on the payment server and the client terminal. The payment server can be a server that runs a server terminal program corresponding to the client terminal. The payment server can also be a server of a third-party payment platform that supports the client terminal. An example process is as follows.

A user can send a wearable device registration request to a payment server through a client terminal, such as using an application (or app) running on a mobile phone terminal to apply for opening of wristband payment. The client terminal can upload a user identifier (such as an account of the user on the payment server), a mobile phone terminal identifier (such as an IMEI), and a wristband identifier (such as a wristband MAC address) in the registration request to the server.

The payment server can generate, through a predetermined algorithm, a symmetric key for authenticating a wristband, such as using a server authentication key and a device authentication key that are the same. The payment server can sign the symmetric key, the user identifier, and the wristband identification together through a preset server private key. The payment server can then encapsulate the signed symmetric key, user identifier, and wristband identifier in a write instruction, and the payment server can send the write instruction to the client terminal through an encrypted channel between the payment server and the client terminal.

After receiving the write instruction of the server terminal, the client terminal can verify validity of the data in the write instruction according to a preset terminal public key, and the client terminal can directly reject the write instruction if the data is invalid. If the validity verification succeeds, the client terminal can be connected to a wristband designated in the write instruction. After the connection is successful, the client terminal can write the symmetric key issued by the payment server in the wristband. In some implementations, confirmation can occur when the user taps on the wristband when prompted for confirmation, after which the symmetric key can be written in a storage area of the wristband.

After the write operation is successful, the client terminal can generate a pair of asymmetric keys according to the user identifier, such as a user public key and a user private key corresponding to the user identifier. The client terminal can sign a result indicating whether the write operation is successful. The result can include the wristband identifier and the user public key generated through a preset terminal private key. The client terminal can encapsulate the signed information in a write acknowledgment and send the write acknowledgment to the payment server through an encrypted channel. The user private key can be stored locally by the client terminal.

After receiving the write acknowledgment of the client terminal, the payment server can verify the signature of the client terminal through a preset server public key. The payment server can reject the registration request of the client terminal if the verification fails. After the signature verification succeeds, the payment server can issue a password confirmation request to the client terminal, such as to require the client terminal to provide a password of an account of the user on the payment server.

The client terminal can display, to the user, prompt information for inputting a password. The user can input the password of his/her account on the payment server. The client terminal can send a password confirmation acknowledgment that includes the received password to the payment server.

The payment server can verify the user password in the password confirmation acknowledgment. After the verification succeeds, the payment server can store a corresponding relationship between the symmetric key (such as the server authentication key), the user identifier, the mobile phone identifier, the wristband identifier, and the user public key generated by the client terminal. The payment server can then notify the client terminal that the wristband is registered successfully, at which time the registration process can end.

After the wristband is registered successfully on the payment server, if the user is hoping to make a payment through the wristband, the user can send a payment authentication request to the server through the client terminal. The authentication request can include information of an order to be paid, a user identifier, a mobile phone terminal identifier, and a wristband identifier.

After receiving the authentication request of the client terminal, the payment server can compare the mobile phone terminal identifier in the authentication request with the mobile phone terminal identifier in the stored corresponding relationship, which corresponds to the wristband identifier in the authentication request. If the identifiers are different, the authentication request can be rejected, and the payment can fail. If the identifiers are the same, the payment server can generate random plaintext data that is then used as downlink authentication information. The payment server can sign the downlink authentication information, the user identifier, and the wristband identifier by using a preset server private key. The payment server can then encapsulate the information in a detection instruction and send the detection instruction to the client terminal through an encrypted channel between the payment server and the client terminal.

After receiving the detection instruction of the payment server, the client terminal can first verify validity of signature data in the detection instruction according to a preset terminal public key. If the data is invalid, the detection instruction can be rejected, and the payment can fail. After validity verification of the signature is successful, the client terminal can connected to a wristband designated in the detection instruction. After the connection is successful, the client terminal can send the downlink authentication information in the detection instruction to the wristband. The wristband can encrypt the downlink authentication information by using the stored symmetric key to generate uplink authentication information, and the wristband can return the uplink authentication information to the client terminal. The process of encrypting the downlink authentication information by the wristband does not require user confirmation, which can further simplify user operations and improve the user's experiences.

After receiving the uplink authentication information generated by the wristband, the client terminal can sign the uplink authentication information using a locally-stored user private key. The client terminal can then encapsulate the signed data and the signed wristband identifier in a detection acknowledgment and sends the detection acknowledgment to the payment server through an encrypted channel between the client terminal and the payment server.

After receiving the detection acknowledgment uploaded by the client terminal, the payment server can perform signature verification on the detection acknowledgment according to the user public key corresponding to the wristband identifier in the detection acknowledgment. If the signature verification fails, the authentication request can fail. After the signature verification succeeds, the payment server can encrypt the downlink authentication information by using a symmetric key corresponding to the wristband identifier. The payment server can then compare the encrypted data with the uplink authentication information in the detection acknowledgment. Comparison can determine, for example, whether the downlink authentication information encrypted by the payment server is the same as the downlink authentication information encrypted by the wristband. If the information matches, then the payment server can return a message of successful authentication to the client terminal and continues paying an order. If the information does not match, then the payment server can return a message of unsuccessful authentication to the client terminal. After receiving the message of successful authentication, the client terminal can complete a user order payment operation together with the payment server. If receiving the message of unsuccessful authentication, then the client terminal can notify the user that this payment cannot be completed due to unsuccessful authentication.

Figure 6:
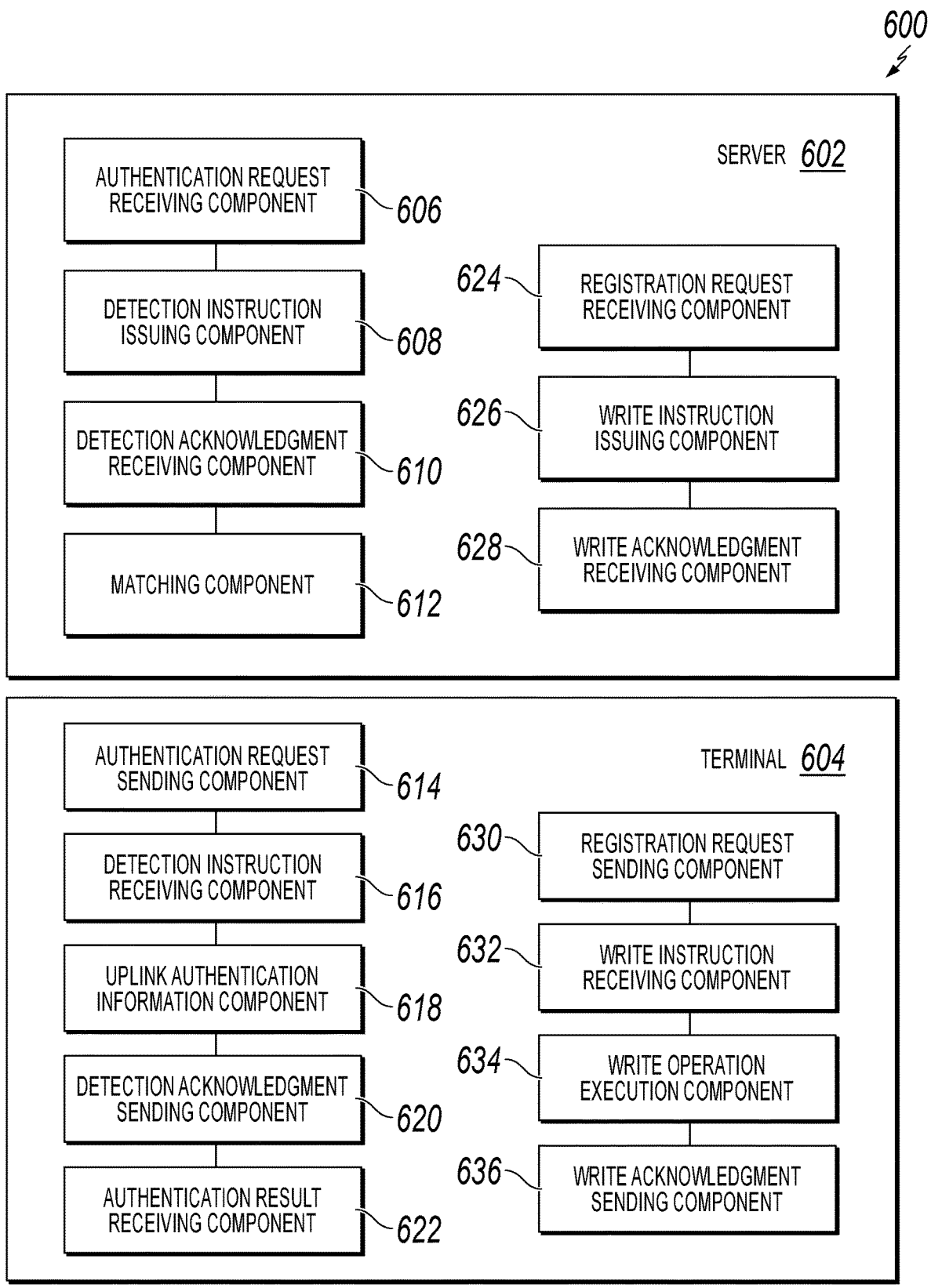
FIG. 6 shows an example of a system for user authentication and wireless device registration, according to an implementation of the present disclosure.

FIG. 6 shows an example of a system 600 for user authentication and wireless device registration, according to an implementation of the present disclosure. In some implementations, components of system 600 can perform the operations of methods 200-500 of FIGS. 2-5. System 600 includes at least one server 602 and at least one terminal 604. The server 602 stores relationships between a user identifier, a wearable device identifier, and a server authentication key of the user. Information from the stored relationships can be used for user authentication and wireless device registration.

Components of the server 602 and the at least one terminal 604 (as well as counterpart or additional components of terminals) can include a server-side apparatus for authenticating a user, a terminal-side apparatus for authenticating the user (such as applied to a terminal connected to a wearable device of the user), a server-side apparatus for registering a wearable device, a terminal-side apparatus for registering a wearable device, a server-side payment apparatus, a terminal-side payment apparatus, and a payment apparatus applied to a wearable device. All these apparatuses can be implemented through software, and can also be implemented through hardware or through a combination of software and hardware. By taking software implementation as an example, an apparatus in a logical sense can be formed by reading a corresponding computer program instruction into a memory through a central processing unit (CPU) of a server, a terminal, or a wearable device, and running the computer program instruction. In terms of the hardware level, in addition to the CPU, the memory, and non-volatile memory, the terminal or wearable device can further include other hardware such as a chip for sending and receiving wireless signals, and the server can further include other hardware such as a board card for implementing a network communication function.

The server 602 can support server-side authentication of a wearable device. In some implementations, the server 602 includes an authentication request receiving component 606, a detection instruction issuing component 608, a detection acknowledgment receiving component 610, and a matching component 612, each performing various operations of the server-side authentication.

The authentication request receiving component 606 is configured to receive an authentication request sent by the user through a terminal, such as the terminal 604. The authentication request includes at least one of the user identifier and the wearable device identifier of the user.

The detection instruction issuing component 608 is configured to acquire downlink authentication information. Using the acquired information, the detection instruction issuing component 608 can issue, to the terminal 604, a detection instruction that includes the downlink authentication information and the wearable device identifier of the user.

The detection acknowledgment receiving component 610 is configured to receive a detection acknowledgment, returned by the terminal, which includes uplink authentication information. The uplink authentication information can be generated, for example, by a wearable device designated in the detection instruction according to a device authentication key and the downlink authentication information. The device authentication key can be the same as, or can correspond to, the server authentication key.

The matching component 612 is configured to match the downlink authentication information with the uplink authentication information by using the server authentication key of the user. For example, the user can pass the authentication if the matching succeeds.

In some implementations, the server further stores a user public key of the user. The user public key corresponds to the user identifier, the wearable device identifier, and the server authentication key of the user. The user public key and a user private key (stored in the terminal) are a pair of keys. The detection acknowledgment returned by the terminal is signed by using the user private key. In some implementations, the server 602 also includes a detection acknowledgment verification module configured to perform signature verification on the detection acknowledgment of the terminal according to the user public key of the user. During verification, the authentication on the user can be determined to fail if the verification fails.

In some implementations, the server 602 also stores a terminal identifier. The terminal identifier corresponds to the user identifier, the wearable device identifier, and the server authentication key of the user. In some implementations, the authentication request further includes a terminal identifier for sending the authentication request. In some implementations, the server 602 also includes a terminal identifier verification module configured to determine that the authentication of the user fails. Authentication can fail, for example, if the terminal identifier corresponding to the user identifier or the wearable device identifier in the authentication request is different from the terminal identifier for sending the authentication request.

In some implementations, the server 602 further stores a server private key. The server private key and a terminal public key (stored in the terminal) are a pair of keys. In some implementations, the server 602 also includes a detection instruction signing module configured to sign the detection instruction by using the server private key.

In some implementations, the server 602 serves as a payment server, and the authentication request is a payment request. In some implementations, the server 602 includes a payment service module configured to provide a payment service for a user passing the authentication.

The terminal 604 can be used for terminal-side authentication of the wearable device. For example, during authorization, the terminal 604 can be connected to a wearable device of the user. In some implementations, the terminal 604 includes an authentication request sending component 614, a detection instruction receiving component 616, an uplink authentication information component 618, a detection acknowledgment sending component 620, and an authentication result receiving component 622.

The authentication request sending component 614 is configured to send an authentication request to a server according to an operation of the user. The authentication request can include at least one of a user identifier and a wearable device identifier of the user.

The detection instruction receiving component 616 is configured to receive a detection instruction of the server. The detection instruction can include downlink authentication information and the wearable device identifier.

The uplink authentication information component 618 is configured to send the downlink authentication information to a wearable device designated in the detection instruction and receive uplink authentication information returned by the wearable device. The uplink authentication information can be generated by the wearable device according to a stored device authentication key and the downlink authentication information. The device authentication key can be the same as, or can correspond to, a server authentication key stored in the server.

The detection acknowledgment sending component 620 is configured to send, to the server, a detection acknowledgment. For example, the detection acknowledgment can include the uplink authentication information.

The authentication result receiving component 622 is configured to receive a user authentication result determined by the server according to the uplink authentication information, the downlink authentication information, and the server authentication key.

In some implementations, the terminal 604 stores a user private key of the user. The user private key and a user public key (stored in the server) are a pair of keys that are used together during authentication. The terminal 604 can also include a detection acknowledgment signing module configured to sign the detection acknowledgment by using the user private key of the user.

In some implementations, the terminal 604 stores a terminal public key, and the terminal public key and a server private key stored in the server are a pair of keys that are used together during authentication. The detection instruction issued by the server is signed by using the server private key. The apparatus further includes: a detection instruction verification unit configured to perform signature verification on the detection instruction of the server according to the terminal public key, and reject the detection instruction if the verification fails.

In some implementations, the authentication request is a payment request. The terminal 604 can complete a payment operation of the user after the user authentication is determined to be successful.

The server 602 can also include modules for server-side registration of a wearable device. For example, the server 602 can include registration request receiving component 624, a write instruction issuing component 626, and a write acknowledgment receiving component 628. The registration request receiving component 624 is configured to receive a wearable device registration request sent by a user through a terminal, the registration request can include a user identifier and a wearable device identifier of the user. The write instruction issuing component 626 is configured to acquire a server authentication key of the user and a device authentication key, and issue to the terminal a write instruction that includes the device authentication key and the wearable device identifier of the user. The write acknowledgment receiving component 628 is configured to receive a write acknowledgment returned by the terminal, and if the write acknowledgment indicates that the device authentication key has been successfully stored in a wearable device designated in the write instruction, store a corresponding relationship between the user identifier, the wearable device identifier, and the server authentication key of the user.

In some implementations, the write acknowledgment receiving unit 628 includes a password confirmation request issuing module and a password confirmation acknowledgment receiving module. The password confirmation request issuing module is configured to issue a password confirmation request to the terminal when the write acknowledgment indicates that the device authentication key has been successfully stored in the wearable device designated in the write instruction. The password confirmation acknowledgment receiving module configured to receive, from the terminal, a password confirmation acknowledgment that includes a user password, and if the user password is correct, store the corresponding relationship between the user identifier, the wearable device identifier, and the server authentication key of the user.

In some implementations, the write acknowledgment returned by the terminal further includes a user public key generated by the terminal. In this case, the password confirmation acknowledgment receiving module is also configured to receive, from the terminal, a password confirmation acknowledgment that includes a user password, and if the user password is correct, store a corresponding relationship between the user identifier, the wearable device identifier, the server authentication key, and the user public key of the user.

In some implementations, the server 602 further stores a server private key and a server public key. The server private key and a terminal public key stored in the terminal are a pair of keys that can be used together during authentication. The server public key and a terminal private key stored in the terminal can be a pair of keys. In some implementations, the server 602 can further include a write instruction signing unit configured to sign the write instruction by using the server private key. In some implementations, the server 602 further includes a write acknowledgment verification unit configured to perform signature verification on the write acknowledgment of the terminal by using the server public key, and reject the registration request if the verification fails.

Figure 7:
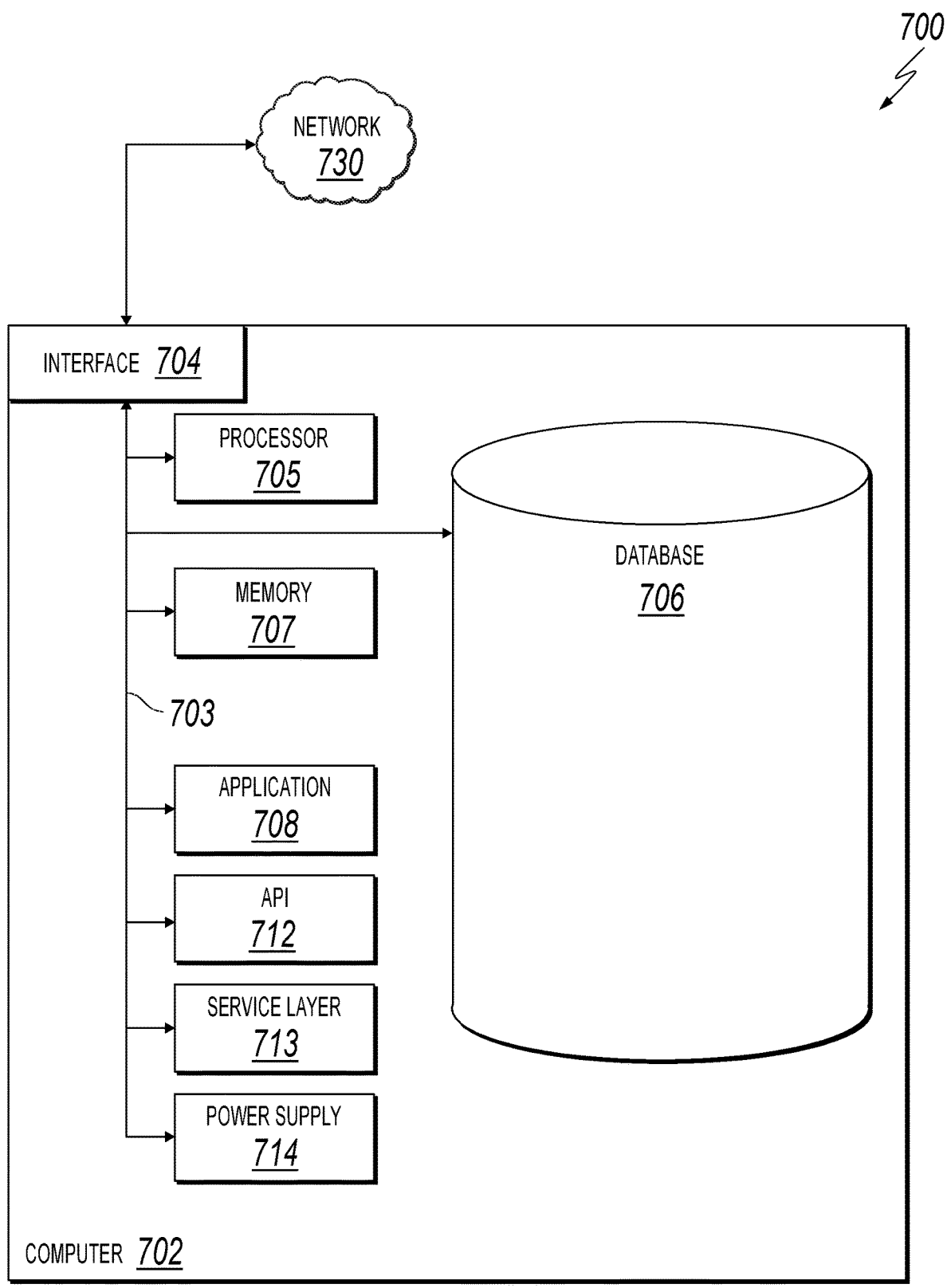
FIG. 7 is a block diagram illustrating an example of a computer system used to provide computational functionalities associated with described algorithms, methods, functions, processes, flows, and procedures as described in the instant disclosure, according to an implementation of the present disclosure.

FIG. 7 is a block diagram of an example of a computer system 700 used to provide computational functionalities associated with described algorithms, methods, functions, processes, flows, and procedures, as described in the instant disclosure, according to an implementation. The illustrated computer 702 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 702 can comprise a computer that includes an input device, such as a keypad, keyboard, touch screen, or other device that can accept user information, and an output device that conveys information associated with the operation of the computer 702, including digital data, visual, or audio information (or a combination of information), or a graphical-type user interface (UI) (or GUI).

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 can be configured to operate within environments, including cloud-computing-based, local, global, or other environment (or a combination of environments).

At a high level, the computer 702 is an electronic computing device operable to receive, transmit, process, store, or manage data and information associated with the described subject matter. According to some implementations, the computer 702 can also include or be communicably coupled with an application server, e-mail server, web server, caching server, streaming data server, or other server (or a combination of servers).

The computer 702 can receive requests over network 730 from a client application (for example, executing on another computer 702) and respond to the received requests by processing the received requests using an appropriate software application(s). In addition, requests can also be sent to the computer 702 from internal users (for example, from a command console or by other appropriate access method), external or third-parties, other automated applications, as well as any other appropriate entities, individuals, systems, or computers.

Each of the components of the computer 702 can communicate using a system bus 703. In some implementations, any or all of the components of the computer 702, hardware or software (or a combination of both hardware and software), can interface with each other or the interface 704 (or a combination of both), over the system bus 703 using an application programming interface (API) 712 or a service layer 713 (or a combination of the API 712 and service layer 713). The API 712 can include specifications for routines, data structures, and object classes. The API 712 can be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 can be accessible for all service consumers using the service layer 713. Software services, such as those provided by the service layer 713, provide reusable, defined functionalities through a defined interface. For example, the interface can be software written in JAVA, C++, or other suitable language providing data in extensible markup language (XML) format or other suitable format. While illustrated as an integrated component of the computer 702, alternative implementations can illustrate the API 712 or the service layer 713 as stand-alone components in relation to other components of the computer 702 or other components (whether or not illustrated) that are communicably coupled to the computer 702. Moreover, any or all parts of the API 712 or the service layer 713 can be implemented as child or sub-modules of another software module, enterprise application, or hardware module without departing from the scope of this disclosure.

The computer 702 includes an interface 704. Although illustrated as a single interface 704 in FIG. 7, two or more interfaces 704 can be used according to particular needs, desires, or particular implementations of the computer 702. The interface 704 is used by the computer 702 for communicating with other systems that are connected to the network 730 (whether illustrated or not) in a distributed environment. Generally, the interface 704 comprises logic encoded in software or hardware (or a combination of software and hardware) and is operable to communicate with the network 730. More specifically, the interface 704 can comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors can be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a database 706 that can hold data for the computer 702 or other components (or a combination of both) that can be connected to the network 730 (whether illustrated or not). For example, database 706 can be an in-memory, conventional, or other type of database storing data consistent with this disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases (of the same or combination of types) can be used according to particular needs, desires, or particular implementations of the computer 702 and the described functionality. While database 706 is illustrated as an integral component of the computer 702, in alternative implementations, database 706 can be external to the computer 702.

The computer 702 also includes a memory 707 that can hold data for the computer 702 or other components (or a combination of both) that can be connected to the network 730 (whether illustrated or not). Memory 707 can store any data consistent with this disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same or combination of types) can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in this disclosure. For example, application 708 can serve as one or more components, modules, or applications. Further, although illustrated as a single application 708, the application 708 can be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or other power management functionality). In some implementations, the power-supply 714 can include a power plug to allow the computer 702 to be plugged into a wall socket or other power source to, for example, power the computer 702 or recharge a rechargeable battery.

There can be any number of computers 702 associated with, or external to, a computer system containing computer 702, each computer 702 communicating over network 730. Further, the term "client," "user," and other appropriate terminology can be used interchangeably, as appropriate, without departing from the scope of this disclosure. Moreover, this disclosure contemplates that many users can use one computer 702, or that one user can use multiple computers 702.

Described implementations of the subject matter can include one or more features, alone or in combination.

For example, in a first implementation, a computer-implemented method, comprising: receiving, at a server, an authentication request from a terminal, the authentication request including at least one of a user identifier of a user and a wearable device identifier of the user, the server storing a relationship between the user identifier, the wearable device identifier, and a server authentication key; acquiring, by the server, downlink authentication information, and issuing, to the terminal, a detection instruction that includes the downlink authentication information and the wearable device identifier; receiving, by the server, a detection acknowledgment returned by the terminal that includes uplink authentication information, the uplink authentication information being generated by a wearable device designated in the detection instruction according to a device authentication key and the downlink authentication information, the device authentication key being the same as, or corresponding to, the server authentication key; and authenticating, by the server, the user including matching the downlink authentication information with the uplink authentication information by using the server authentication key of the user, wherein the user passes the authentication if the matching succeeds.

The foregoing and other described implementations can each, optionally, include one or more of the following features:

A first feature, combinable with any of the following features, wherein: the server further stores a user public key of the user, wherein the user public key corresponds to the user identifier, the wearable device identifier, and the server authentication key of the user, and wherein the user public key and a user private key stored in the terminal are a pair of keys; the detection acknowledgment returned by the terminal is signed by using the user private key stored in the terminal; and the computer-implemented method further comprises performing signature verification on the detection acknowledgment of the terminal according to the user public key of the user, wherein authenticating the user fails if the verification fails.

A second feature, combinable with any of the previous or following features, wherein: the server further stores a terminal identifier, wherein the terminal identifier corresponds to the user identifier, the wearable device identifier, and the server authentication key of the user; the authentication request further includes a terminal identifier for sending the authentication request; and the computer-implemented method further comprises failing the authentication of the user when the terminal identifier corresponding to the user identifier or the wearable device identifier in the authentication request is different from the terminal identifier for sending the authentication request.

A third feature, combinable with any of the previous or following features, wherein: the server further stores a server private key, wherein the server private key and a terminal public key stored in the terminal are a pair of keys; and the computer-implemented method further comprises signing the detection instruction by using the server private key.

A fourth feature, combinable with any of the previous or following features, wherein the detection instruction and the detection acknowledgment are transmitted through an encrypted channel between the server and the terminal.

A fifth feature, combinable with any of the previous or following features, wherein: the server is a payment server and the authentication request is a payment request; and the computer-implemented method further comprises providing a payment service for users passing the authentication.

A sixth feature, combinable with any of the previous or following features, wherein authenticating the user includes authenticating an identity of the user relative to a login by the user to a personal account.

A seventh feature, combinable with any of the previous or following features, wherein authenticating the user includes authenticating an identity of the user making a payment through a third-party payment platform.

In a second implementation, a computer-implemented method, comprising: sending, by a terminal connected to a wearable device of a user, an authentication request to a server according to an operation of the user, the authentication request including at least one of a user identifier and a wearable device identifier of the user; receiving, at the terminal, a detection instruction of the server, the detection instruction including downlink authentication information and the wearable device identifier; sending, by the terminal, the downlink authentication information to a wearable device designated in the detection instruction, and receiving uplink authentication information returned by the wearable device, the uplink authentication information being generated by the wearable device according to a stored device authentication key and the downlink authentication information, and the device authentication key being the same as, or corresponding to, a server authentication key stored in the server; sending, to the server, a detection acknowledgment that includes the uplink authentication information; and authenticating the user, including receiving a user authentication result determined by the server according to the uplink authentication information, the downlink authentication information, and the server authentication key.

The foregoing and other described implementations can each, optionally, include one or more of the following features:

A first feature, combinable with any of the following features, wherein: the terminal stores a user private key of the user, wherein the user private key and a user public key stored in the server are a pair of keys; and the computer-implemented method further comprises signing the detection acknowledgment by using the user private key of the user.

A second feature, combinable with any of the previous or following features, wherein: the terminal stores a terminal public key, wherein the terminal public key and a server private key stored in the server are a pair of keys; the detection instruction issued by the server is signed by using the server private key.

A third feature, combinable with any of the previous or following features, wherein the authentication request is a payment request, and wherein the terminal completes a payment operation of the user after the user authentication result is the authentication being successful.

A fourth feature, combinable with any of the previous or following features, further comprising: performing signature verification on the detection instruction of the server according to the terminal public key; and rejecting the detection instruction if the verification fails.

A fifth feature, combinable with any of the previous or following features, wherein the authentication request includes an identity of the user relative to a login by the user to a personal account.

A sixth feature, combinable with any of the previous or following features, wherein the authentication request includes an identity of the user making a payment through a third-party payment platform.

A seventh feature, combinable with any of the previous or following features, further comprising providing, for display to the user, a message indicating that authorization has occurred.

In a third implementation, a non-transitory, computer-readable medium storing one or more instructions executable by a computer system to perform operations comprising: receiving, at a server, an authentication request from a terminal, the authentication request including at least one of a user identifier of a user and a wearable device identifier of the user, the server storing a relationship between the user identifier, the wearable device identifier, and a server authentication key; acquiring, by the server, downlink authentication information, and issuing, to the terminal, a detection instruction that includes the downlink authentication information and the wearable device identifier; receiving, by the server, a detection acknowledgment returned by the terminal that includes uplink authentication information, the uplink authentication information being generated by a wearable device designated in the detection instruction according to a device authentication key and the downlink authentication information, the device authentication key being the same as, or corresponding to, the server authentication key; and authenticating, by the server, the user including matching the downlink authentication information with the uplink authentication information by using the server authentication key of the user, wherein the user passes the authentication if the matching succeeds.

In a fourth implementation, a non-transitory, computer-readable medium storing one or more instructions executable by a computer system to perform operations comprising: sending, by a terminal connected to a wearable device of a user, an authentication request to a server according to an operation of the user, the authentication request including at least one of a user identifier and a wearable device identifier of the user; receiving, at the terminal, a detection instruction of the server, the detection instruction including downlink authentication information and the wearable device identifier; sending, by the terminal, the downlink authentication information to a wearable device designated in the detection instruction, and receiving uplink authentication information returned by the wearable device, the uplink authentication information being generated by the wearable device according to a stored device authentication key and the downlink authentication information, and the device authentication key being the same as, or corresponding to, a server authentication key stored in the server; sending, to the server, a detection acknowledgment that includes the uplink authentication information; and authenticating the user, including receiving a user authentication result determined by the server according to the uplink authentication information, the downlink authentication information, and the server authentication key.

In a fifth implementation, a computer-implemented system, comprising: one or more computers; and one or more computer memory devices interoperably coupled with the one or more computers and having tangible, non-transitory, machine-readable media storing instructions, that when executed by the one or more computers, perform operations using methods comprising: receiving, at a server, an authentication request from a terminal, the authentication request including at least one of a user identifier of a user and a wearable device identifier of the user, the server storing a relationship between the user identifier, the wearable device identifier, and a server authentication key; acquiring, by the server, downlink authentication information, and issuing, to the terminal, a detection instruction that includes the downlink authentication information and the wearable device identifier; receiving, by the server, a detection acknowledgment returned by the terminal that includes uplink authentication information, the uplink authentication information being generated by a wearable device designated in the detection instruction according to a device authentication key and the downlink authentication information, the device authentication key being the same as, or corresponding to, the server authentication key; and authenticating, by the server, the user including matching the downlink authentication information with the uplink authentication information by using the server authentication key of the user, wherein the user passes the authentication if the matching succeeds.

In a sixth implementation, a computer-implemented system, comprising: one or more computers; and one or more computer memory devices interoperably coupled with the one or more computers and having tangible, non-transitory, machine-readable media storing instructions, that when executed by the one or more computers, perform operations using methods comprising: sending, by a terminal connected to a wearable device of a user, an authentication request to a server according to an operation of the user, the authentication request including at least one of a user identifier and a wearable device identifier of the user; receiving, at the terminal, a detection instruction of the server, the detection instruction including downlink authentication information and the wearable device identifier; sending, by the terminal, the downlink authentication information to a wearable device designated in the detection instruction, and receiving uplink authentication information returned by the wearable device, the uplink authentication information being generated by the wearable device according to a stored device authentication key and the downlink authentication information, and the device authentication key being the same as, or corresponding to, a server authentication key stored in the server; sending, to the server, a detection acknowledgment that includes the uplink authentication information; and authenticating the user, including receiving a user authentication result determined by the server according to the uplink authentication information, the downlink authentication information, and the server authentication key.

In a seventh implementation, a computer-implemented method, comprising: receiving, at a server, a wearable device registration request sent through a terminal, the registration request including a user identifier and a wearable device identifier of a user; acquiring a server authentication key of the user and a device authentication key, and issuing, to the terminal, a write instruction that includes the device authentication key and the wearable device identifier of the user; and registering the wearable device including receiving a write acknowledgment returned by the terminal, and if the write acknowledgment indicates that the device authentication key has been successfully stored in a wearable device designated in the write instruction, storing a corresponding relationship between the user identifier, the wearable device identifier, and the server authentication key of the user.

The foregoing and other described implementations can each, optionally, include one or more of the following features:

A first feature, combinable with any of the following features, wherein storing a corresponding relationship between the user identifier, the wearable device identifier, and the server authentication key of the user comprises: issuing a password confirmation request to the terminal; and receiving, from the terminal, a password confirmation acknowledgment that includes a user password, and if the user password is correct, storing the corresponding relationship between the user identifier, the wearable device identifier, and the server authentication key of the user.

A second feature, combinable with any of the previous or following features, wherein: the write acknowledgment returned by the terminal includes a user public key generated by the terminal; and storing a corresponding relationship between the user identifier, the wearable device identifier, and the server authentication key of the user further comprises storing a corresponding relationship between the user identifier, the wearable device identifier, the server authentication key, and the user public key of the user.

A third feature, combinable with any of the previous or following features, wherein: the server further stores a server private key and a server public key, wherein the server private key and a terminal public key stored in the terminal are a pair of keys, and wherein the server public key and a terminal private key stored in the terminal are a pair of keys; and the computer-implemented method further comprises: signing the write instruction by using the server private key; performing signature verification on the write acknowledgment of the terminal by using the server public key; and rejecting the registration request if the verification fails.

A fourth feature, combinable with any of the previous or following features, wherein the wearable device registration request and the write acknowledgment are encrypted.

A fifth feature, combinable with any of the previous or following features, wherein the terminal is a payment client terminal, and wherein registration of the user occurs during a payment transaction.

In an eighth implementation, a computer-implemented, comprising: sending, by a terminal, a wearable device registration request to a server according to an operation of a user, the registration request including a user identifier and a wearable device identifier of the user; receiving, at the terminal, a write instruction of the server, the write instruction including a device authentication key and the wearable device identifier of the user; executing an operation of writing the device authentication key on a wearable device designated in the write instruction; and registering the wearable device, including sending a write acknowledgment to the server, the write acknowledgment including a message indicating whether the device authentication key is successfully written.

The foregoing and other described implementations can each, optionally, include one or more of the following features:

A first feature, combinable with any of the following features, further comprising receiving, after the write acknowledgment is sent to the server, a password confirmation request of the server, and returning, to the server, a password confirmation acknowledgment including a user password input by the user.

A second feature, combinable with any of the previous or following features, further comprising generating, after the operation of writing the device authentication key is successful, a user private key and a user public key of the user, and storing the user private key, wherein the write acknowledgment includes the user public key of the user.

A third feature, combinable with any of the previous or following features, wherein: the terminal stores a terminal public key and a terminal private key, wherein the terminal public key and a server private key stored in the server are a pair of keys, and wherein the terminal private key and a server public key stored in the server are a pair of keys; and the computer-implemented method further comprises: performing signature verification on the write instruction of the server by using the terminal public key; rejecting the write instruction if the verification fails; and signing the write acknowledgment by using the terminal private key.

A fourth feature, combinable with any of the previous or following features, wherein the wearable device registration request and the write acknowledgment are encrypted.

A fifth feature, combinable with any of the previous or following features, wherein the terminal is a payment client terminal, and wherein registration of the user occurs during a payment transaction.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which can also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures are shown as individual modules that implement the various features and functionality through various objects, methods, or other processes, the programs can instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/–R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory can include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network can communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    receiving, at a server and from a terminal, an authentication request, the authentication request including a user identifier of a user and a wearable device identifier of the wearable device of the user, the server storing a relationship between the user identifier, the wearable device identifier, and a server authentication key;
    acquiring, by the server, downlink authentication information;
    issuing, by the server and to the terminal, a detection instruction that includes the downlink authentication information and the wearable device identifier;
    receiving, by the server and from the terminal, a detection acknowledgment returned by the terminal that includes uplink authentication information, the uplink authentication information being generated by the wearable device designated in the detection instruction according to a device authentication key and the downlink authentication information, the device authentication key being the same as, or corresponding to, the server authentication key; and
    authenticating, by the server, the user including:
        performing signature verification on the detection acknowledgment of the terminal that is signed by using a user private key stored in the terminal according to a user public key of the user stored in the server, wherein the user fails the authentication when the signature verification fails; and
        matching the downlink authentication information with the uplink authentication information by using the server authentication key of the user, wherein the user passes the authentication if the matching succeeds.

2. The computer-implemented method of claim 1, wherein the user public key stored in the terminal corresponds to the user identifier, the wearable device identifier, and the server authentication key of the user, and wherein the user public key and the user private key stored in the terminal are a pair of keys.

3. The computer-implemented method of claim 1, wherein:
    the server further stores a terminal identifier, wherein the terminal identifier corresponds to the user identifier, the wearable device identifier, and the server authentication key of the user;
    the authentication request further includes a terminal identifier for sending the authentication request; and
    the computer-implemented method further comprises failing the authentication of the user when the terminal identifier corresponding to the user identifier or the wearable device identifier in the authentication request is different from the terminal identifier for sending the authentication request.

4. The computer-implemented method of claim 1, wherein:
    the server further stores a server private key, wherein the server private key and a terminal public key stored in the terminal are a pair of keys; and
    the computer-implemented method further comprises signing the detection instruction by using the server private key.

5. The computer-implemented method of claim 1, wherein the detection instruction and the detection acknowledgment are transmitted through an encrypted channel between the server and the terminal.

6. The computer-implemented method of claim 1, wherein:

the server is a payment server and the authentication request is a payment request; and the computer-implemented method further comprises providing a payment service for users passing the authentication.

7. The computer-implemented method of claim 1, wherein authenticating the user includes authenticating an identity of the user relative to a login by the user to a personal account.

8. The computer-implemented method of claim 1, wherein authenticating the user includes authenticating an identity of the user making a payment through a third-party payment platform.

9. A computer-implemented method, comprising:
sending, by a terminal connected to a wearable device of a user and to a server, an authentication request according to an operation of the user, the authentication request including a user identifier and a wearable device identifier of the wearable device of the user;
receiving, at the terminal and from the server, a detection instruction of the server, the detection instruction including downlink authentication information and the wearable device identifier;
sending, by the terminal, the downlink authentication information to the wearable device designated in the detection instruction;
receiving, by the terminal and from the wearable device, uplink authentication information returned by the wearable device, the uplink authentication information being generated by the wearable device according to a stored device authentication key and the downlink authentication information, and the device authentication key being the same as, or corresponding to, a server authentication key stored in the server;
signing, by the terminal, a detection acknowledgment by using a user private key of the user stored in the terminal;
sending, by the terminal and to the server, the detection acknowledgment that includes the uplink authentication information; and
authenticating the user, including receiving, by the terminal and from the server, a user authentication result determined by the server according to the uplink authentication information, the downlink authentication information, and the server authentication key.

10. The computer-implemented method of claim 9, wherein the user private key and a user public key stored in the server are a pair of keys.

11. The computer-implemented method of claim 9, wherein:
the terminal stores a terminal public key, wherein the terminal public key and a server private key stored in the server are a pair of keys;
the detection instruction issued by the server is signed by using the server private key.

12. The computer-implemented method of claim 9, wherein the authentication request is a payment request, and wherein the terminal completes a payment operation of the user after the user authentication result is the authentication being successful.

13. The computer-implemented method of claim 12, further comprising:
performing signature verification on the detection instruction of the server according to a terminal public key; and
rejecting the detection instruction if the verification fails.

14. The computer-implemented method of claim 1, wherein the authentication request includes an identity of the user relative to a login by the user to a personal account.

15. The computer-implemented method of claim 1, wherein the authentication request includes an identity of the user making a payment through a third-party payment platform.

16. The computer-implemented method of claim 1, further comprising providing, for display to the user, a message indicating that authorization has occurred.

17. A non-transitory, computer-readable medium storing one or more instructions executable by a computer system to perform operations comprising:
receiving, at a server and from a terminal, an authentication request, the authentication request including a user identifier of a user and a wearable device identifier of the wearable device of the user, the server storing a relationship between the user identifier, the wearable device identifier, and a server authentication key;
acquiring, by the server, downlink authentication information;
issuing, by the server and to the terminal, a detection instruction that includes the downlink authentication information and the wearable device identifier;
receiving, by the server and from the terminal, a detection acknowledgment returned by the terminal that includes uplink authentication information, the uplink authentication information being generated by the wearable device designated in the detection instruction according to a device authentication key and the downlink authentication information, the device authentication key being the same as, or corresponding to, the server authentication key; and
authenticating, by the server, the user including:
performing signature verification on the detection acknowledgment of the terminal that is signed by using a user private key stored in the terminal according to a user public key of the user stored in the server, wherein the user fails the authentication when the signature verification fails; and
matching the downlink authentication information with the uplink authentication information by using the server authentication key of the user, wherein the user passes the authentication if the matching succeeds.

18. A non-transitory, computer-readable medium storing one or more instructions executable by a computer system to perform operations comprising:
sending, by a terminal connected to a wearable device of a user and to a server, an authentication request according to an operation of the user, the authentication request including a user identifier and a wearable device identifier of the wearable device of the user;
receiving, at the terminal and from the server, a detection instruction of the server, the detection instruction including downlink authentication information and the wearable device identifier;
sending, by the terminal, the downlink authentication information to the wearable device designated in the detection instruction;
receiving, by the terminal and from the wearable device, uplink authentication information returned by the wearable device, the uplink authentication information being generated by the wearable device according to a stored device authentication key and the downlink authentication information, and the device authentication key being the same as, or corresponding to, a server authentication key stored in the server;

signing, by the terminal, a detection acknowledgment by using a user private key of the user stored in the terminal;

sending, by the terminal and to the server, the detection acknowledgment that includes the uplink authentication information; and authenticating the user, including receiving, by the terminal and from the server, a user authentication result determined by the server according to the uplink authentication information, the downlink authentication information, and the server authentication key.

19. A computer-implemented system, comprising:

one or more computers; and one or more computer memory devices interoperably coupled with the one or more computers and having tangible, non-transitory, machine-readable media storing instructions, that when executed by the one or more computers, perform operations using methods comprising:

receiving, at a server and from a terminal, an authentication request, the authentication request including a user identifier of a user and a wearable device identifier of a wearable device of the user, the server storing a relationship between the user identifier, the wearable device identifier, and a server authentication key;

acquiring, by the server, downlink authentication information;

issuing, by the server and to the terminal, a detection instruction that includes the downlink authentication information and the wearable device identifier;

receiving, by the server and from the terminal, a detection acknowledgment returned by the terminal that includes uplink authentication information, the uplink authentication information being generated by the wearable device designated in the detection instruction according to a device authentication key and the downlink authentication information, the device authentication key being the same as, or corresponding to, the server authentication key; and authenticating, by the server, the user including:

performing signature verification on the detection acknowledgment of the terminal that is signed by using a user private key stored in the terminal according to a user public key of the user stored in the server, wherein the user fails the authentication when the signature verification fails; and matching the downlink authentication information with the uplink authentication information by using the server authentication key of the user, wherein the user passes the authentication if the matching succeeds.

20. A computer-implemented system, comprising:

one or more computers; and one or more computer memory devices interoperably coupled with the one or more computers and having tangible, non-transitory, machine-readable media storing instructions, that when executed by the one or more computers, perform operations using methods comprising:

sending, by a terminal connected to a wearable device of a user and to a server, an authentication request according to an operation of the user, the authentication request including a user identifier and a wearable device identifier of the wearable device of the user;

receiving, at the terminal and from the server, a detection instruction of the server, the detection instruction including downlink authentication information and the wearable device identifier;

sending, by the terminal, the downlink authentication information to the wearable device designated in the detection instruction;

receiving, by the terminal and from the wearable device, uplink authentication information returned by the wearable device, the uplink authentication information being generated by the wearable device according to a stored device authentication key and the downlink authentication information, and the device authentication key being the same as, or corresponding to, a server authentication key stored in the server;

signing, by the terminal, a detection acknowledgment by using a user private key of the user stored in the terminal;

sending, by the terminal and to the server, the detection acknowledgment that includes the uplink authentication information; and authenticating the user, including receiving, by the terminal and from the server, a user authentication result determined by the server according to the uplink authentication information, the downlink authentication information, and the server authentication key.

* * * * *